US012705388B2

(12) United States Patent
Zhang et al.

(10) Patent No.: US 12,705,388 B2
(45) Date of Patent: Aug. 11, 2026

(54) METHODS AND APPARATUSES FOR EXECUTING GPU TASK IN CONFIDENTIAL COMPUTE ARCHITECTURE

(71) Applicants: Alipay (Hangzhou) Information Technology Co., Ltd., Hangzhou (CN); Southern University Of Science And Technology, Shenzhen (CN)

(72) Inventors: Fengwei Zhang, Hangzhou (CN); Chenxu Wang, Hangzhou (CN); Yunjie Deng, Hangzhou (CN); Shoumeng Yan, Hangzhou (CN); Zhengyu He, Hangzhou (CN)

(73) Assignees: Alipay (Hangzhou) Information Technology Co., Ltd., Hangzhou (CN); Southern University of Science and Technology, Shenzhen (CN)

( * ) Notice: Subject to any disclaimer, the term of this patent is extended or adjusted under 35 U.S.C. 154(b) by 59 days.

(21) Appl. No.: 18/980,904

(22) Filed: Dec. 13, 2024

(65) Prior Publication Data

US 2025/0200217 A1 Jun. 19, 2025

(30) Foreign Application Priority Data

Dec. 15, 2023 (CN) ......................... 202311738871.9

(51) Int. Cl.
*G06F 21/62* (2013.01)
*G06F 9/50* (2006.01)

(52) U.S. Cl.
CPC ........ *G06F 21/6245* (2013.01); *G06F 9/5016* (2013.01)

(58) Field of Classification Search
CPC ........................... G06F 21/6245; G06F 9/5016
See application file for complete search history.

(56) References Cited

U.S. PATENT DOCUMENTS 9,483,635 B2 * 11/2016 Azab ....................... G06F 21/53
9,489,512 B2 * 11/2016 Thom .................. G06F 21/575

(Continued)

FOREIGN PATENT DOCUMENTS

CN 116561824 A 8/2023
CN 116823585 A 9/2023

OTHER PUBLICATIONS

Deng et al., "StrongBox: A GPU Tee on Arm Endpoints," Paper, Presented at the CCS'22: Proceedings of the 29th ACM SIGSAC Conference on Computer and Communications Security, Los Angeles, CA, USA, Nov. 7-11, 2022; ACM, Nov. 7, 2022, 15 pages.

(Continued)

*Primary Examiner* — Viral S Lakhia
(74) *Attorney, Agent, or Firm* — Fish & Richardson P.C.

(57) ABSTRACT

A graphics processing unit (GPU) task is executed in a confidential compute architecture. GPU software in a non-secure world configures, based on task code and a cache description of a GPU task, a stub data structure including cache areas allocated based on the cache description and metadata indicating each cache area. In a realm segment in a memory, a root world root monitor configures a real data structure corresponding to the stub data structure, and stores to-be-processed confidential data. The root monitor updates a granule protection table (GPT) table so that based on an updated GPT table, a target segment storing the metadata and the task code is accessible to a GPU and has realm world permission for all other objects. The root monitor modifies a target mapping relationship so that the GPU executes the GPU task by using the target segment and the real data structure.

19 Claims, 5 Drawing Sheets

(56) References Cited

U.S. PATENT DOCUMENTS

| | | | | |
|---|---|---|---|---|
| 11,295,008 | B2 * | 4/2022 | Kim | G06F 21/53 |
| 11,443,034 | B2 * | 9/2022 | Li | G06F 21/57 |
| 11,663,382 | B1 * | 5/2023 | Cascioli | G06F 30/33 703/15 |
| 11,829,495 | B2 * | 11/2023 | Bradbury | G06F 21/53 |
| 11,907,748 | B2 * | 2/2024 | Banack | G06F 9/45558 |
| 2020/0089918 | A1 * | 3/2020 | Du | G06F 21/53 |
| 2020/0319867 | A1 * | 10/2020 | Ballard | G06F 8/24 |
| 2024/0220453 | A1 * | 7/2024 | Behera | G06F 16/137 |

OTHER PUBLICATIONS

Jang et al, "Heterogeneous Isolated Execution for Commodity GPUs," Paper, Presented at the ASPLOS'19: Proceedings of the Twenty-Fourth International Conference on Architectural Support for Programming Languages and Operating Systems, Providence, RI, USA, Apr. 13-17, 2019; ACM, Apr. 4, 2019, pp. 455-468.

Jiang et al., "CRONUS: Fault-isolated, Secure and High-performance Heterogeneous Computing for Trusted Execution Environment," Paper, Presented at the 2022 55th IEEE/ACM International Symposium on Microarchitecture (MICRO), Chicago, IL, USA, Oct. 1-5, 2022; IEEE, Oct. 26, 2022, 20 pages.

Volos et al., "Graviton: Trusted Execution Environments on GPUs," Paper, OSDI'18: Proceedings of the 13th USENIX Conference on Operating Systems Design and Implementation, Carlsbad, CA, USA, Oct. 8-10, 2018; USENIX, Oct. 8, 2018, 17 pages.

Zhu et al., "Enabling Rack-scale Confidential Computing using Heterogeneous Trusted Execution Environment," Paper, Presented at the 2020 IEEE Symposium on Security and Privacy (SP), San Francisco, CA, USA, May 8-21, 2020; IEEE, Jul. 30, 2020, pp. 1450-1465.

* cited by examiner

| Security status | Non-secure **PAS** | Secure **PAS** | Realm **PAS** | Root **PAS** |
|---|---|---|---|---|
| Non-secure | ✓ | × | × | × |
| Secure | ✓ | ✓ | × | × |
| Realm | ✓ | × | ✓ | × |
| Root | ✓ | ✓ | ✓ | ✓ |

METHODS AND APPARATUSES FOR EXECUTING GPU TASK IN CONFIDENTIAL COMPUTE ARCHITECTURE

CROSS-REFERENCE TO RELATED APPLICATIONS

This application claims priority to Chinese Patent Application No. 202311738871.9, filed on Dec. 15, 2023, which is hereby incorporated by reference in its entirety.

TECHNICAL FIELD

One or more embodiments of this specification relate to a confidential computing framework, and in particular, to methods and apparatuses for executing a graphics processing unit (GPU) task in a confidential computing framework.

BACKGROUND

With development of computing technologies in various industries and an increase of cloud and end users, people store numerous data in various computer devices. Along with the development of the industry, people pay increasing attention to security of devices and data. To ensure the security of devices and data, architecture vendors respectively have proposed their own solutions. For example, ARM proposed the TrustZone technology, AMD proposed the Secure Encrypted Virtualization (SEV) technology, and Intel proposed the Software Guard Extensions (SGX) technology. These solutions provide users with a secure and trusted execution environment for secretly storing and processing data to protect the data from damages caused by untrusted cores and conventional applications. The ARM TrustZone technology is used as an example. In this technology, running environments of conventional cores and applications are considered as a non- secure world, an isolated secure world is created, and a security layer with the highest permission is used for world switching. The non-secure world cannot directly access the secure world, and can access specific resources after passing firmware verification at the security layer.

Although security of user data is effectively ensured by using the ARM confidential compute architecture, it still has some defects, one of which is the inability to provide support for confidential computing on accelerators such as a GPU. This makes it a great challenge to security in accelerating tasks by using GPUs under the technical framework. This needs to be improved.

SUMMARY

One or more embodiments of this specification describe methods and apparatuses for executing a GPU task in a confidential compute architecture, to provide a confidential computing environment for executing GPU tasks based on hardware characteristics of an existing confidential compute architecture, thereby supporting GPU confidential computing.

According to a first aspect, a method for executing a GPU task in a confidential compute architecture is provided. The confidential compute architecture includes a secure world, a realm world, a non-secure world, and a root world. The method includes:

GPU software in the non-secure world configures, based on task code and a cache description of a first GPU task that are provided by a user, a stub data structure of a first stub task in a non-secure world segment of a memory. The stub data structure includes a plurality of cache areas allocated based on the cache description and metadata indicating each cache area.

In a segment, in the memory, corresponding to a first realm, a root monitor in the root world configures a real data structure corresponding to the stub data structure, and stores to- be-processed confidential data in the segment.

The root monitor updates a granule protection table (GPT) so that based on an updated GPT table, a target segment is accessible to a GPU and has realm world permission for all other objects. The target segment stores the metadata and the task code.

The root monitor modifies a target mapping relationship so that the GPU executes the first GPU task by using the target segment and the real data structure.

According to a second aspect, a root monitor in a confidential compute architecture is provided. The confidential compute architecture includes a secure world, a realm world, a non- secure world, and a root world. The root monitor is located in the root world and includes a shadow task component and a GPU environment protection component.

The shadow task component is configured to: in response to a case in which GPU software in the non-secure world configures a stub data structure of a first stub task in a non-secure world segment of a memory, in a segment, in the memory, corresponding to a first realm, configure a real data structure corresponding to the stub data structure, and store to-be-processed confidential data in the segment. The stub data structure includes a plurality of cache areas allocated based on a cache description provided by a user and metadata indicating each cache area.

The GPU environment protection component is configured to update a granule protection table GPT so that based on an updated GPT table, a target segment is accessible to a GPU and has realm world permission for all other objects. The target segment stores the metadata and task code, provided by the user, of a first GPU task.

The shadow task component is further configured to modify a target mapping relationship so that the GPU executes the first GPU task by using the target segment and the real data structure.

According to a third aspect, a computing device is provided, including a memory and some processors. The computing device forms a confidential compute architecture. The confidential compute architecture includes a secure world, a realm world, a non-secure world, and a root world. The root world includes the root monitor according to the second aspect.

In solutions provided in embodiments of this specification, GPU confidential computing compatible with ARM confidential compute architecture CCA is implemented by using a shadow task mechanism. Based on the shadow task mechanism, GPU software in the non-secure world creates a stub task that does not include real data, and schedules and manages the stub task as a routine process. After the stub task is submitted, a root monitor creates a real GPU task that includes real data, and provides a protected execution environment for the real GPU task. Then, the root monitor replaces the stub task with the real GPU task so that GPU hardware executes the real GPU task in the protected execution environment. In this way, GPU confidential computing is implemented in the ARM confidential compute architecture CCA.

BRIEF DESCRIPTION OF DRAWINGS

To describe the technical solutions in embodiments of this application more clearly, the following briefly describes the accompanying drawings for describing the embodiments. Clearly, the accompanying drawings in the following descriptions show merely some embodiments of this application, and a person of ordinary skill in the art can still derive other accompanying drawings from these accompanying drawings without creative efforts.

DESCRIPTION OF EMBODIMENTS

The following describes solutions provided in this specification with reference to the accompanying drawings.

To ensure data security, ARM provides the TrustZone technology. In this technology, running environments of conventional cores and applications are considered as a non-secure world (Normal World), an isolated secure world (Secure World) is created, and a security layer with the highest permission is used for world switching.

Specifically, in an ARMv8-A architecture, a CPU core classifies exceptions into four levels through privilege classification: EL0 to EL3. Here, EL0 represents an application level, EL1 is used for a system kernel (kernel), EL2 represents a virtual machine manager (hypervisor), and EL3 represents a security layer monitor. These four levels may also be used to indicate permission levels of running environments. In the TrustZone technology, a CPU security status is divided into a non-secure (Normal) state and a secure state. EL0 and EL1 may run in any state, for example, an untrusted operating system OS (untrusted OS) may be executed in EL in the non- secure world, and a trusted OS is executed in EL1 in the secure world. EL2 can be used in the secure state. EL3 is the security layer monitor, always exists in the secure world, and is used to perform security status switching.

In this architecture, the non-secure world cannot directly access the secure world, and can access specific resources after passing verification performed by the security layer monitor. Sensitive or confidential data and high-permission software applications run in the secure world. In this way, a trusted execution environment (TEE) is provided for these confidential data.

Based on the above-mentioned TrustZone basic architecture, ARM has recently released the improved ARM confidential compute architecture CCA (Confidential Compute Architecture). The ARM confidential compute architecture is a part of the ARMv9-A architecture. The ARM confidential compute architecture introduces realm management extension based on the original TrustZone architecture. The extension further introduces the realm (Realm) world and the root (Root) world in addition to the non-secure world and the secure world that already exist in the TrustZone technology. To support isolation between different worlds, the CCA architecture provides a realm management extension RME (Realm Management Extension) component at a hardware layer to extend an isolation mode.

Figures 1, 2:
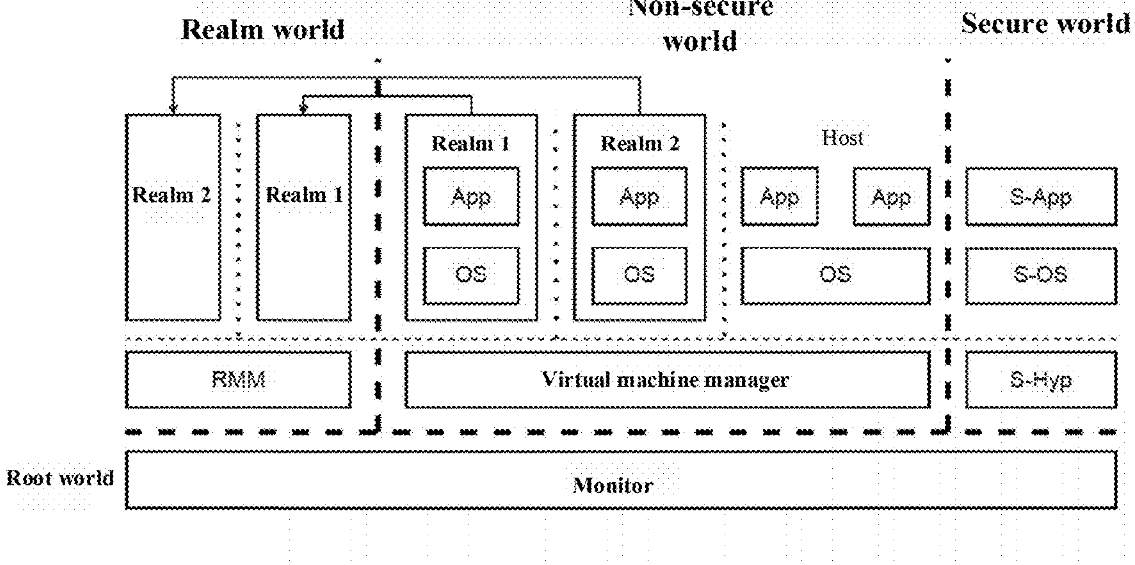
FIG. 1 is a schematic diagram illustrating an ARM confidential compute architecture.
FIG. 2 shows access permission control on each world for physical address space in a confidential compute architecture.

FIG. 1 is a schematic diagram illustrating an ARM confidential compute architecture. As shown in FIG. 1, in the ARM confidential compute architecture CCA, a running environment is divided into four worlds: a secure world, a non-secure world (Normal), a realm world, and a root world. A root world monitor with the highest permission runs in the root world and is responsible for isolation and communication between worlds. The realm world is used to provide a protected virtual machine confidential computing environment named as a confidential realm for a virtual machine. A realm management monitor RMM runs in the realm world, and is responsible for managing execution of a realm virtual machine and interaction with the non-secure world. A user may place a virtual machine as a realm virtual machine in a confidential realm and isolate illegal access from external software. Specifically, the user may create the virtual machine by using a virtual machine manager in the non-secure world and transfer the virtual machine to the realm world by using the realm management monitor RMM so that the virtual machine becomes the realm virtual machine. The realm management monitor RMM is responsible for check and protection related to security of the confidential realm. Realm virtual machines are isolated from each other by using a virtualization technology. The realm management monitor is responsible for managing accessible address space of different realm virtual machines. The realm virtual machine does not need to trust the non-secure world and the secure world and needs to trust only the realm management monitor and the root world monitor.

Correspondingly, the ARM confidential compute architecture CCA also divides physical address space PAS (Physical address spaces) of a memory into four worlds. FIG. 2 shows access permission control on a secure state of each world for physical address space in a confidential compute architecture. As shown in FIG. 2, the root world has the highest access permission and can access address space of all the four worlds. The non-secure world has the lowest access permission and can only access address space of the non-secure world. The secure world and the realm world each can access the address space of the non-secure world, and can also access their own respective address space.

In an ARM confidential compute architecture, address space access control on different worlds is implemented by constructing a granule protection table GPT (Granule Protection Table) and performing granule protection check GPC (Granule Protection Check) based on the GPT table. Specifically, the confidential compute architecture CCA maintains the granule protection table GPT in the memory. The granule protection table records a security status of each physical memory segment with a fine granule. Typically, a recorded granule is in units of a memory page (a segment of a size of 4 kB). In this way, the GPT table records a security status and access permission of each memory page. When migration and change occur in allocation of memory pages in different worlds, entries in the GPT can be dynamically updated.

When a processor accesses the memory, the above-mentioned RME component at the hardware layer performs granule protection check GPC. In the check, a security status of the current CPU is acquired, and a security status of a memory page requested to be accessed is acquired by reading the GPT table to check whether the security status of the current CPU matches the security status of the memory page. If the GPC check is not passed (for example, if a host OS of the non-secure world requests to access a memory of the realm world), a granule protection exception signal is sent to deny this memory access, thereby ensuring isolation between the worlds. By using the foregoing isolation mechanism, the ARM confidential compute architecture further provides an isolated confidential compute environment for the realm virtual machine in the realm world.

In addition, execution of more tasks is expected to be accelerated by using the GPU. However, it is difficult for the existing ARM compute framework to provide effective confidential protection for computing tasks of the GPU. In this aspect, GPUs of most ARM devices are embedded GPUs and do not contain independent memories. The ARM compute framework considers the GPU as an untrusted common peripheral. Therefore, the GPU needs to share a memory with the CPU and many untrusted peripherals and is more vulnerable to attacks. In another aspect, based on current working procedures of GPUs of most ARM devices, task execution and scheduling of the GPUs are managed by GPU software (such as a GPU driver and a related programming software library). However, the GPU software is located in the non-secure world and is vulnerable to attacks.

Specifically, the GPU software is used to manage a computing environment of the GPU and interact with GPU hardware. Usually, to prepare an execution environment, the GPU software allocates a physical memory and creates a GPU cache based on a need of a GPU task. Next, core components of the GPU task are loaded into the memory, and these core components include GPU task code, to-be-processed data, and metadata (for example, a pointer or a job descriptor indicating a GPU cache address). The GPU software also creates a GPU page table and configures a corresponding GPU register so that the GPU is allowed to access the foregoing core components through direct memory access DMA. The GPU software also plans an execution order of GPU tasks and submits the GPU tasks through memory mapping MMIO.

Assume that a strong opponent controls all software stacks of the non-secure world and the secure world, including the GPU software, the untrusted OS, the virtual machine manager hypervisor, and software of the same level in the secure world. The opponent wants to spy on or even tamper with confidential data of a GPU task. The confidential data includes input data, intermediate data, or an execution result of the task. In this case, the opponent may access the above-mentioned unified memory, and read confidential data stored in the memory or control, to read data in the above-mentioned memory, a peripheral that can perform DMA, thereby launching an attack. In addition, the opponent may also acquire kernel permission by using a bug in a kernel and attack or control the GPU software to acquire core component information of the task; or modify a status of the GPU register, etc. by changing an execution order of a confidential task to initiate a tampering attack.

To resolve a GPU secure computing problem, some researchers propose to create an isolated environment for GPU running by using the TEE of the GPU. Currently, work of most GPU trusted computing environments is deployed on the Intel platform. However, in consideration of differences in hardware architecture characteristics, it is difficult to directly transfer these work to the ARM platform. For a design of the ARM platform, researchers propose the StrongBox solution and the CRONUS solution. However, both the StrongBox solution and the CRONUS solution rely on the conventional ARM TrustZone technology and components of the secure world, and therefore cannot defend against an envisaged attacker in the ARM confidential compute architecture (that is, the secure world is also destroyed and exploited by the attacker). In addition, there is a specific conflict between the working procedure of the ARM confidential compute architecture and these solutions. For example, the StrongBox solution using virtualization cannot be directly compatible with the virtual machine manager; and the CRONUS solution deploys the GPU software entirely within the trusted execution environment, which is inconsistent with a framework design of the CCA confidential compute architecture.

In view of this, an embodiment of this specification provides a solution. Based on hardware characteristics of the ARM confidential compute architecture, security protection for a GPU computing task is provided without affecting an original function design of the ARM confidential compute architecture to support confidential computing on a GPU.

Figure 3:
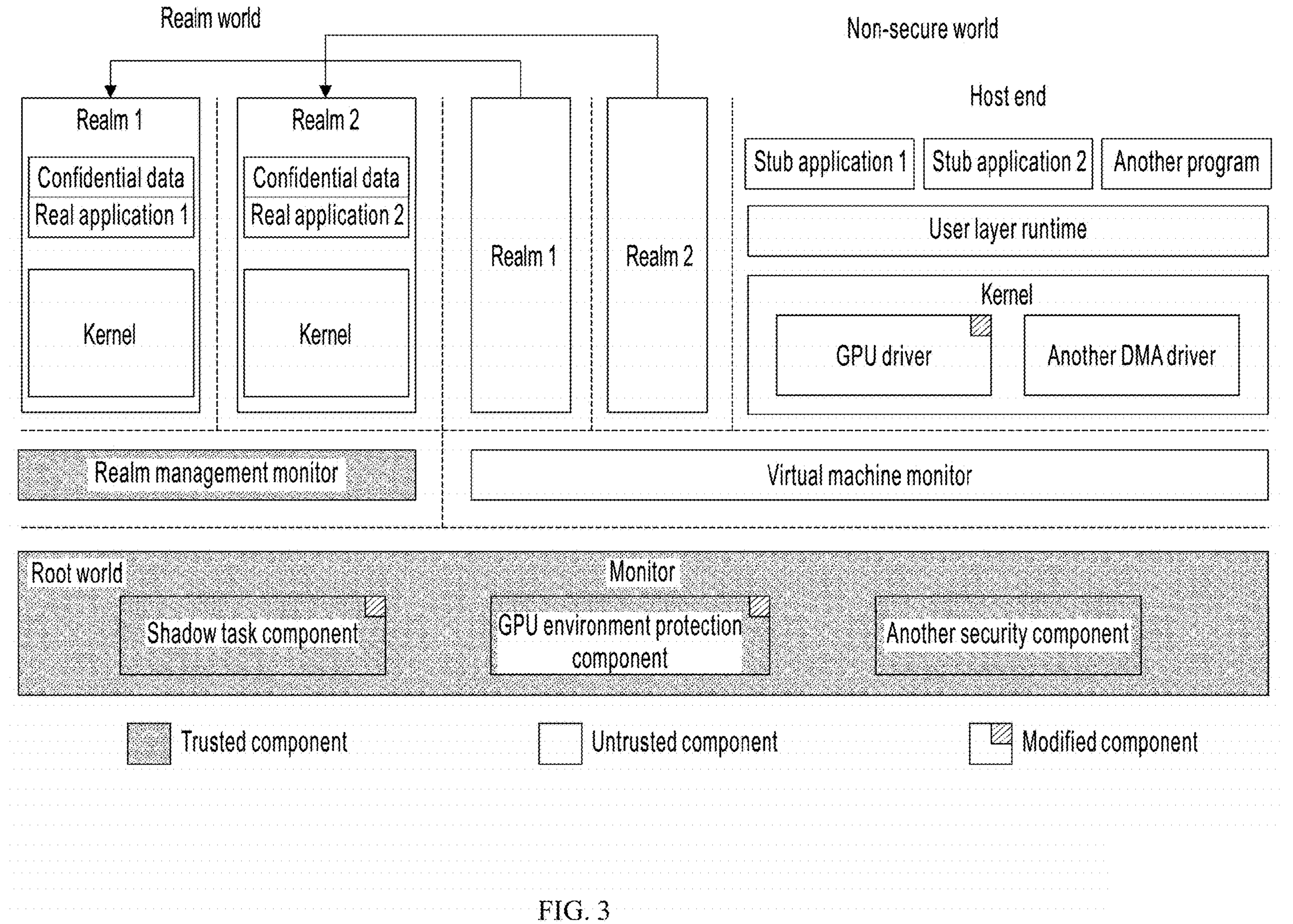
FIG. 3 is a schematic diagram illustrating running of a GPU task in a confidential compute architecture, according to an embodiment.

FIG. 3 is a schematic diagram illustrating running of a GPU task in a confidential compute architecture, according to an embodiment. The system architecture shown in FIG. 3 complies with an ARM confidential compute architecture CCA. A host end runs in a non-secure world. The host end includes a GPU driver and another DMA peripheral driver. A virtual machine manager hypervisor creates some confidential computing “realms” and manages and schedules these confidential computing “realms”. In a realm world newly introduced into the confidential compute architecture CCA, a realm management monitor RMM is deployed to implement memory isolation of different “realms”. A root monitor with the highest permission is deployed in a root world and is configured to manage isolation and switching between worlds and provide security authentication mechanisms such as key management and remote verification. The root monitor may be implemented in a form of secure firmware.

In the foregoing CCA architecture, it is considered that the realm management monitor RMM in the realm world and the root world are fully trusted. This is because memory quantities and code quantities needed by these components are very small, exposed attack surfaces of these components are relatively small, and these components are not vulnerable to attacks. In addition, other components are considered untrusted, including software in a secure world.

In the solution of this embodiment of this specification, to implement GPU confidential computing, two components are introduced into the root monitor in the root world: a shadow task component and a GPU environment protection component. The shadow task component is configured to implement a shadow task mechanism in each embodiment. The GPU environment protection component is configured to protect a GPU running environment from attacks. In addition, in the solution of this embodiment, GPU software (including a GPU driver and a correlation function library) still runs on the host end of the non-secure world, but needs a small amount of modification to assist in completing the shadow task mechanism.

The shadow task mechanism is a new mechanism introduced to make a GPU working procedure compatible with the ARM confidential compute architecture. A core idea of the shadow task mechanism is to allow the GPU software at the host end to create and manage some stub applications, such as memory allocation, GPU buffer area creation, and scheduling and submission of tasks. These stub applications, for example, a stub application 1 and a stub application 2 in FIG. 3, have data structures similar to a data structure of a common GPU task. For example, the data structure includes a GPU page table, metadata, and a GPU buffer area. However, GPU buffer areas of these stub applications do not include real to-be-processed data and only provide descriptions of the GPU buffer areas. The GPU software can submit these stub applications as usual. Different from a conventional way, when the GPU software submits these stub application, the root monitor located in the root world replaces the stub applications with corresponding real GPU applications. The real GPU application has a data structure similar to a data structure of the stub application. However, the data structure of the real GPU application is filled with real to-be-processed confidential data. The root monitor finally submits the real GPU applications to the GPU for computing. Therefore, the solution in this embodiment allows the non- secure world to schedule and manage GPU tasks from different realms without accessing real confidential data. This complies with the assumption of the ARM confidential compute architecture.

With reference to a single GPU application also referred to as a GPU task, the following describes a process of scheduling and executing a GPU computing task and providing an isolated confidential environment for the GPU computing task by using the shadow task mechanism.

Figures 4, 5:
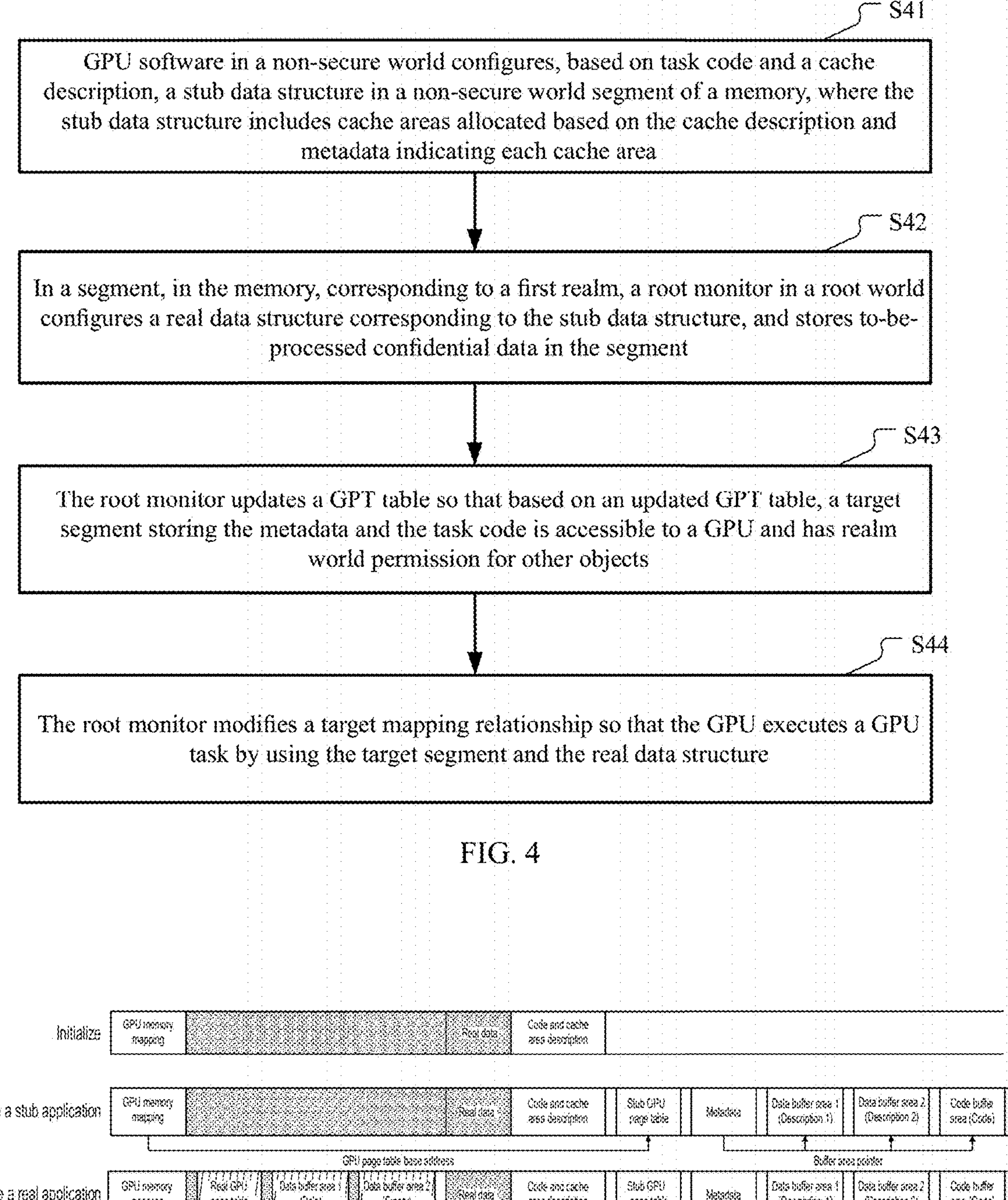
FIG. 4 shows a method for executing a GPU task in a confidential compute architecture, according to an embodiment.
FIG. 5 is a schematic diagram illustrating a data structure of each phase in a shadow task mechanism.

FIG. 4 shows a method for executing a GPU task in a confidential compute architecture, according to an embodiment. FIG. 5 is a schematic diagram illustrating a data structure of each phase in a shadow task mechanism. It may be understood that the method and the shadow task mechanism in FIG. 4 and FIG. 5 are executed based on the confidential compute architecture shown in FIG. 3.

First, in an initialization phase or a preparation phase, a user can apply for a realm and send, to the realm through an encryption channel, real data that needs to be processed by using a GPU task. Specifically, the hypervisor in the non-secure world can create a virtual machine based on a request of the user, and deploy the virtual machine in the realm world as a confidential realm by interacting with the realm management monitor RMM. For convenience of description (if necessary, to be distinguished from another specific realm), the realm that the user applies for is described as a first realm below. After the first realm is created, the user may perform key negotiation with the first realm to establish a secure channel. Specifically, the user may exchange a key with the first realm based on a DH (Diffie-Hellman) protocol, an elliptic curve-based DH protocol, or another protocol, to negotiate an encryption key. Therefore, based on the negotiated key, the user and the first realm can establish a secure encryption channel. By using the secure encryption channel, the first realm can receive confidential data transmitted by the user and store the confidential data in the realm world.

In addition, the user provides two other core components of a to-be-executed GPU task (referred to as a first GPU task below): task code and a cache description to a host end of the non-secure world. The cache description is used to illustrate a need and a description of a GPU data cache, and includes attributes that are expected to be present in the GPU data cache, for example, a quantity of cache areas and a size of a cache area, and an attribute and a type of data (for example, input data or result data, and a type and a size of data) that needs to be stored in each cache area. To prevent the GPU software from tampering with the task code after being attacked, in an embodiment, the user also provides signature information, that is, signs the task code and the cache description, and attaches a signature to the transmitted task code and the transmitted cache description.

As shown in FIG. 5, based on the above-mentioned initialization phase, the first realm obtains confidential data/real data provided by the user and stores the confidential data/real data in the protected realm world (shown in gray). The host end obtains two core components (the task code and the cache description) provided by the user, and stores the two core components in an unprotected area (shown in white) corresponding to the non-secure world.

After the host end obtains the above-mentioned two core components, the GPU software in the host end of the non-secure world can create a stub task based on the two core components. As described above, the GPU software mainly includes GPU driver software, and also includes some function libraries related to the GPU driver software, such as a user layer runtime function library (such as an OpenCL library). The GPU software is modified to create a stub application in the non-secure world based on the shadow task mechanism.

Specifically, as shown in step S41 in FIG. 4, the GPU software in the non-secure world configures, based on the task code and the cache description of the first GPU task that are provided by the user, a stub data structure of a first stub task in a non-secure world segment of a memory. The stub data structure includes a plurality of cache areas created based on the cache description and metadata indicating each cache area.

Specifically, the GPU creates the first stub task. Configuring the stub data structure may include the following steps. As described above, the cache description indicates features such as an expected quantity, an expected size, and expected padding data of the GPU data cache. Based on such cache description, the GPU software may allocate corresponding memory space in a non- secure world segment of the memory, create a code cache area in the non-secure world segment, and some stub data cache areas that comply with a cache description need. In some embodiments, the cache description needs creation of a plurality of data cache areas. For example, one of the plurality of data cache areas is used to store input data, and another one of the plurality of data cache areas is used to store an execution result. Optionally, sometimes the cache description further instructs to create a data cache area for storing an intermediate result. The GPU software correspondingly allocates these data cache areas as stub data cache areas based on the cache description need.

Unlike conventional processing, the GPU software stores only the task code in the code cache area, but does not fill the stub data cache area with real data. In other words, the stub data cache area stores at most description information of data that should be stored in the cache area, and does not store real to-be-processed data. Based on the plurality of cache areas allocated in this way, the GPU software generates metadata used to indicate the plurality of cache areas. Specifically, the metadata can include some pointers that point to addresses of various cache areas. The GPU software also stores the metadata in the non-secure world segment of the memory.

In addition, the GPU software further generates, based on the allocated memory, a GPU page table used to execute the first stub task. The GPU page table can be referred to as a stub GPU page table. The page table records mapping between a virtual address and a memory physical address in a process of executing a GPU task. Initially, GPU memory-mapped MMIO (Memory- Mapped Input/Output) is configured to point to the stub GPU page table. Specifically, the GPU has a translation table base register TTBR configured to store a base address of a page table. The TTBR is mapped to an address in the memory through GPU memory-mapped MMIO. Initially, through GPU MMIO, the base address of the page table points to a memory address of storing the stub GPU page table, that is, points to the stub GPU page table.

In this way, the GPU software creates the first stub task and configures the stub data structure for the first stub task. As shown in FIG. 5, for example, in the memory segment in the non-secure world, the GPU software allocates a data buffer area 1, a data buffer area 2, and a code buffer area. The data buffer areas 1 and 2 store only corresponding data descriptions. The code buffer area stores task code acquired before. Based on the allocated buffer areas, the GPU software generates metadata. The metadata points to the above-mentioned data buffer areas 1 and 2 and the code buffer area. In addition, the GPU software generates the stub GPU page table, and causes GPU memory mapping to point to the stub GPU page table.

It can be learned that a process of creating a stub task is similar to a process of creating a regular task, but real data are not filled in a data cache corresponding to the stub task. Therefore, the created stub task is an "empty" task that does not have real data, but has the same data structure as a real task. The stub task can be managed and scheduled.

Therefore, after the first stub task is created, the GPU software normally inserts the first stub task into a GPU task queue, arranges a task execution order, and submits the first stub task to the GPU hardware by using the root monitor.

After receiving submission of the first stub task, the root monitor creates a real task in the realm world, that is, performs step S42 in FIG. 4. In this step, the root monitor configures a real data structure corresponding to the stub data structure in a first realm segment, in the memory, corresponding to the first realm, and stores, in the first realm segment, the confidential data provided by the user.

Specifically, the root monitor creates a real data buffer area of a corresponding size and with corresponding attributes based on the stub data buffer area in the stub data structure, and fills the real data buffer area with real data or temporarily leaves the real data buffer area empty based on the description in the real data buffer area In an embodiment, the stub data structure has a plurality of data buffer areas. The plurality of data buffer areas include an input data cache area for storing input data and a result data cache area for storing result data. Therefore, the root monitor correspondingly creates a real input data cache area and a result data cache area in the first realm segment, stores the confidential data previously provided by the user in the created input data cache area, and temporarily leaves the result data cache area empty.

In addition, the root monitor further creates a real GPU page table based on the stub GPU page table, and stores the real GPU page table in the first realm segment. For this, the root monitor can first verify page table entries recorded in the stub GPU page table, for example, verify whether a duplicate or illegal mapping exists in the page table entries. If the verification succeeds, the root monitor constructs the real GPU page table by copying or reproducing a page table entry in the stub GPU page table. However, it should be noted that because the data cache area in the stub cache structure does not store real data and does not participate in real GPU computing, in the real GPU page table, an entry related to the data cache area is modified to point to a real data cache area in the real data structure.

Still in the above-mentioned example, as shown in FIG. 5, in a phase of creating a real application, the real data buffer areas 1 and 2 corresponding to the two data buffer areas in the stub task are created in a protected realm segment. The real confidential data are stored in the data buffer area 1, and the data buffer area 2 is temporarily left empty to store result data. In addition, the root monitor further generates the real GPU page table, and stores the real GPU page table in the first realm segment.

When a real GPU task needs to be executed, the root monitor first provides a protected execution environment for execution of the real GPU task. Specifically, the root monitor protects memory access of a core component in the GPU task by using a granule protection check (GPC)-based memory protection mechanism provided in the ARM confidential compute architecture. Because the real data buffer area and the real GPU page table are already in the protected realm world, additional protection needs to be provided for a target segment that is stored in the non-secure world and stores important sensitive data. The target segment includes a segment that stores metadata and task code. In addition, a GPU memory-mapped MMIO segment also belongs to a protected segment because the GPU memory-mapped MMIO segment contains the base address of the GPU page table.

For this, based on the GPC mechanism, the root monitor performs step S43, and the root monitor updates a granule protection table GPT so that based on an updated GPT table, the target segment is accessible to the GPU and has realm world permission for all other objects.

As described above, the confidential compute architecture CCA maintains the granule protection table GPT in the memory. The granule protection table records a security status of each physical memory segment with a fine granule and is used for a GPC check to implement memory isolation. Based on the solution in this embodiment, the root monitor may maintain a plurality of versions of GPT tables so that the target segment has different access permission for different objects.

Specifically, the root monitor maintains at least a first version of GPT table and a second version of GPT table. The first version of GPT table is used by the CPU and another peripheral to access the memory. In an updated first version of GPT table, it can be set that the above-mentioned target segment storing the metadata and the task code belongs to the realm world. In addition, to protect the GPU memory-mapped MMIO segment, it can be set that the GPU memory-mapped MMIO segment belongs to the root world in the above-mentioned first version of GPT table. Based on permission of different worlds shown in FIG. 2, any application that requests memory access by using the CPU or another peripheral device, including software in the secure world, cannot access the above-mentioned target segment and GPU memory mapping.

The second version of GPT table is a GPT table used for the GPU for the first realm. The GPT table can be generated and initialized when the first realm is created. Through updating in step S43, the target segment is set to an accessible segment in the GPT table. Specifically, in an example, in an updated second version of GPT table, it is set that the first realm segment and the target segment belong to the non-secure world and can be accessed, and the other segments belong to the root world and cannot be accessed.

In this way, the root monitor ensures, by updating the GPT table, that memory space needed for a real GPU task is isolated and is not accessed or stolen by other applications, and therefore provides a protected execution environment for execution of the real GPU task.

Preferably, before the real GPU task is executed, the task code and the cache description are further verified to prevent the GPU software under attacks from tampering with the task code or the cache description. Specifically, as described above, the user can attach the signature when providing the task code and the cache description. Therefore, the root monitor can perform signature check, based on the signature, the task code stored in the current code cache area and the cache description stored in the stub data cache area. In addition, the root monitor can further check a status of the GPU to make sure that there is no hidden malicious task code stored in the GPU.

After each check/verification succeeds, the root monitor can submit and initiate execution of the real GPU task. For this, in step S44, the root monitor modifies a target mapping relationship so that the GPU executes the first GPU task by using the target segment and the real data structure.

Specifically, the root monitor modifies the GPU memory mapping and points the base address of the GPU page table to the real GPU page table stored in the first realm. In this way, the stub GPU page table is replaced with the real GPU page table. In addition, the root monitor further modifies a pointer of the metadata so that the pointer points to the real data buffer area. In this way, the stub data buffer area is replaced with the real data buffer area. In this way, the GPU executes the first GPU task by using the target segment and the real data structure. Specifically, the GPU addresses the code cache area and the real data cache area based on the real GPU page table and the modified metadata to perform task processing on the real confidential data in the real data cache area based on the task code in the code cache area.

Still in the above-mentioned example, as shown in FIG. 5, to execute the real GPU task, the GPU memory mapping and the target segment storing the metadata and the task code are set to a protected area by using step S43. Therefore, when the real GPU task is executed, the real GPU page table is addressed based on the GPU memory mapping, and the code cache area and the real data cache area are positioned based on the real GPU page table and the metadata. Therefore, the real confidential data can be processed based on the task code stored in the code cache area. Based on an indication of the metadata, the GPU can further store, in the real result data cache area (that is, the data buffer area 2), a running result obtained through task processing. Based on setting in step S43, all data used in the above-mentioned process is in the protected memory area, thereby ensuring confidentiality of task execution.

After the above-mentioned first GPU task is executed, the root monitor can restore an original execution environment. Specifically, the root monitor can first restore the pointer in the metadata and a register mapping address in the GPU memory-mapped MMIO. Then, the previous GPU execution environment is cleared. This process includes clearing a TLB entry corresponding to the GPU page table and the like. After the GPU execution environment is cleared, conventional access permission of the above-mentioned target segment can be restored by updating the GPT table again, that is, the target segment belongs to the non-secure world after restoration.

As shown in FIG. 5, in an environment restoration phase after the GPU task is executed, data in an execution process can be cleared, and the previously temporarily protected target segment (a GPU memory mapping segment, a metadata segment, and a code cache segment) can be restored to the unprotected non-secure world. The result data generated after execution is stored in the first realm segment of the realm world. The user can read the running result from the first realm by using a secure channel. In this way, confidential execution and confidential computing of the GPU task are completed.

When the process above is reviewed, GPU confidential computing compatible with the ARM confidential compute architecture CCA is implemented by using the shadow task mechanism. Based on the shadow task mechanism, the GPU software in the non-secure world creates a stub task that does not include real data, and schedule and manage the stub task as a routine process. After the stub task is submitted, the root monitor creates a real GPU task that includes real data, and provides a protected execution environment for the real GPU task. Then, the root monitor replaces the stub task with the real GPU task so that the GPU hardware executes the real GPU task in the protected execution environment. In this way, GPU confidential computing is implemented in the ARM confidential compute architecture CCA.

As mentioned above, the GPU secure execution environment is provided by maintaining and updating a plurality of versions of GPT tables. Maintaining the plurality of versions of GPT tables may put some pressure on execution performance of the entire architecture. In some implementations, optimization is further proposed for a manner of maintaining the GPT table to further improve system performance.

As described with reference to step S43, to provide the secure execution environment for the first GPU task, the root monitor needs to maintain at least two versions of GPTs. The first version of GPT table is used for memory access control on the CPU and the another peripheral. The second version of GPT table is used by the GPU to execute a first realm task. Actually, although the another peripheral and the CPU have the same access permission setting for the target segment corresponding to the first GPU task, different peripherals still have unique permission settings different from the permission setting of the CPU for another segment of the memory. In addition, the realm world may have a plurality of mutually isolated realms supporting confidential execution of a plurality of GPU tasks. In this case, a GPT table corresponding to another realm further needs to be maintained for the another realm. Therefore, actually, the root monitor may need to maintain more than two versions of GPT tables.

Figure 6:
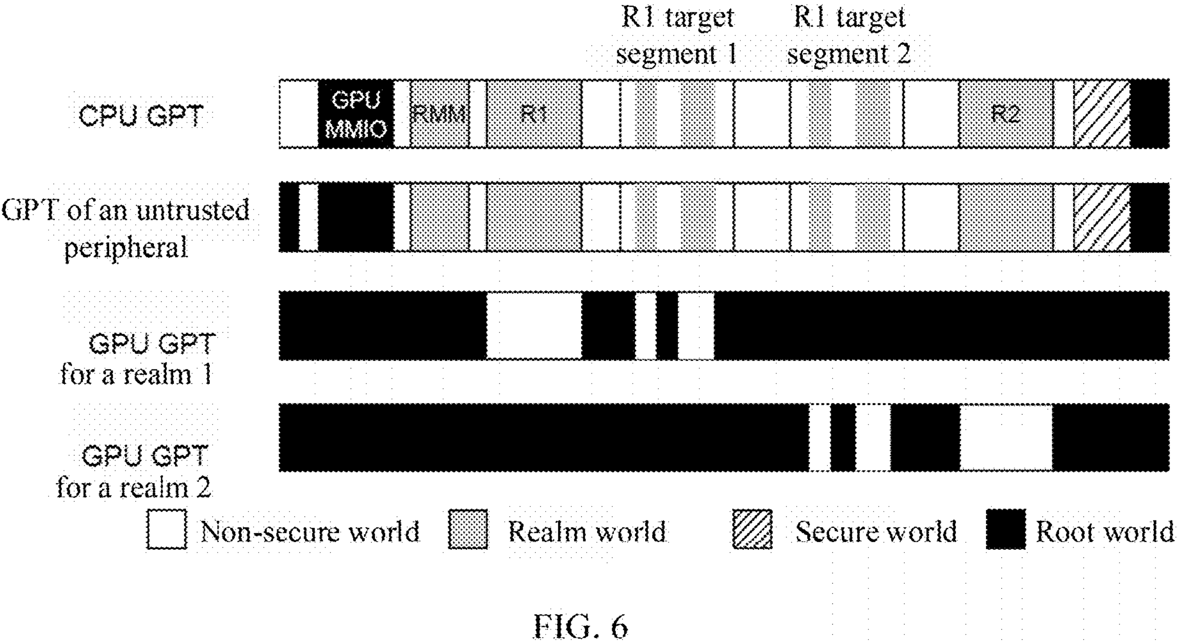
FIG. 6 shows a GPT table maintained by a root monitor in an example scenario.

FIG. 6 shows a GPT table maintained by a root monitor in an example scenario. As shown in FIG. 6, in this example scenario, the realm world includes at least a realm R1 and a realm R2. Assume that users of the two realms respectively request to execute a GPU task 1 based on the realm R1 and to execute a GPU task 2 based on the realm 2. Therefore, the GPU software creates an R1 stub task and an R2 stub task each in a segment originally belonging to the non- secure world. A segment that stores metadata and task code corresponding to the R1 stub task in the R1 stub task is referred to as a target segment 1. A segment that stores metadata and task code corresponding to the R2 stub task in the R2 stub task is referred to as a target segment 2.

To provide isolated execution environments respectively for the GPU task 1 and the GPU task 2, the root monitor needs to maintain at least four GPT tables shown in FIG. 6.

In the GPT table for the CPU, a memory segment corresponding to each of the realm R1 and the realm R2 generally belongs to a realm world segment. In addition, the above-mentioned target segment 1 and the above-mentioned target segment 2 that originally belong to the non-secure world are further set to realm world segments. In addition, it is set that the GPU memory-mapped MMIO segment belongs to the root world.

A GPT table for an untrusted peripheral is generally similar to a GPT table of the CPU. Settings for the realm R1, the realm R2, the target segment 1, and the target segment 2 are the same. A difference is that the peripheral has a memory access limitation corresponding to the peripheral, it is set that some memory segments (for example, a frontmost segment in the figure) that can be accessed by the CPU belong to the root world, and the peripheral does not have permission to access these memory segments.

A GPU GPT table for the realm 1 is a GPT table applicable when the GPU executes the GPU task 1 corresponding to the realm 1. In this table, it is set that the realm RI and the target segment 1 are belong to the non-secure world and can be accessed, and it is set that the other segments are belong to the root world and cannot be accessed. This means that when the GPU executes the GPU task 1 corresponding to the realm 1, only memory data of the realm RI and the target segment 1 can be accessed, and data of any other segment cannot be accessed.

A GPU GPT table for the realm 2 is a GPT table applicable when the GPU executes the GPU task 2 corresponding to the realm 2. In this table, it is set that the realm R2 and the target segment 2 are belong to the non-secure world and can be accessed, and it is set that the other segments are belong to the root world and cannot be accessed. This means that when the GPU executes the GPU task 2 corresponding to the realm 2, only memory data of the realm R2 and the target segment 2 can be accessed, and data of any other segment cannot be accessed.

When hardware (the CPU, the GPU, or the peripheral) requests to access the memory, an RME at a hardware layer performs GPC check based on a corresponding applicable GPT table to perform memory access control.

It can be learned from the two GPU GPT tables for the realm 1 and the realm 2 that memory isolation is also performed between GPU tasks of different realms to ensure security of an execution environment. It can be understood that if more GPU tasks need to be executed based on more realms, more GPT tables need to be maintained.

To alleviate the burden of maintaining a plurality of GPT tables, in an embodiment, the GPT tables are maintained in a hierarchical manner. Specifically, the GPT table supports a hierarchical table architecture including a top-level (top-level) table and a sub-level (sub-level) table. A descriptor in the sub-level table is used to describe only a security attribute of a memory segment, and does not need to describe an address, read/write permission, and another attribute. Based on such characteristics, a sub-level table shared by the CPU and each peripheral can be constructed. Specifically, a segment of memory area is pre-delimited, and a sub-level table is constructed to manage access control of the segment of memory area. It is set that the GPU software creates a stub task in this predetermined segment of memory area. Further, GPT tables of the CPU and each peripheral are configured, so that table descriptors all point to the unified sub- level table. In use, whether to protect the target segment storing the metadata and the task code can be set merely by flexibly modifying the security attribute in the sub-level layer table in different phases. Because the GPT tables of the GPU and each peripheral both point to the sub-level table, a security setting in the sub-level table can be shared.

Figure 7:
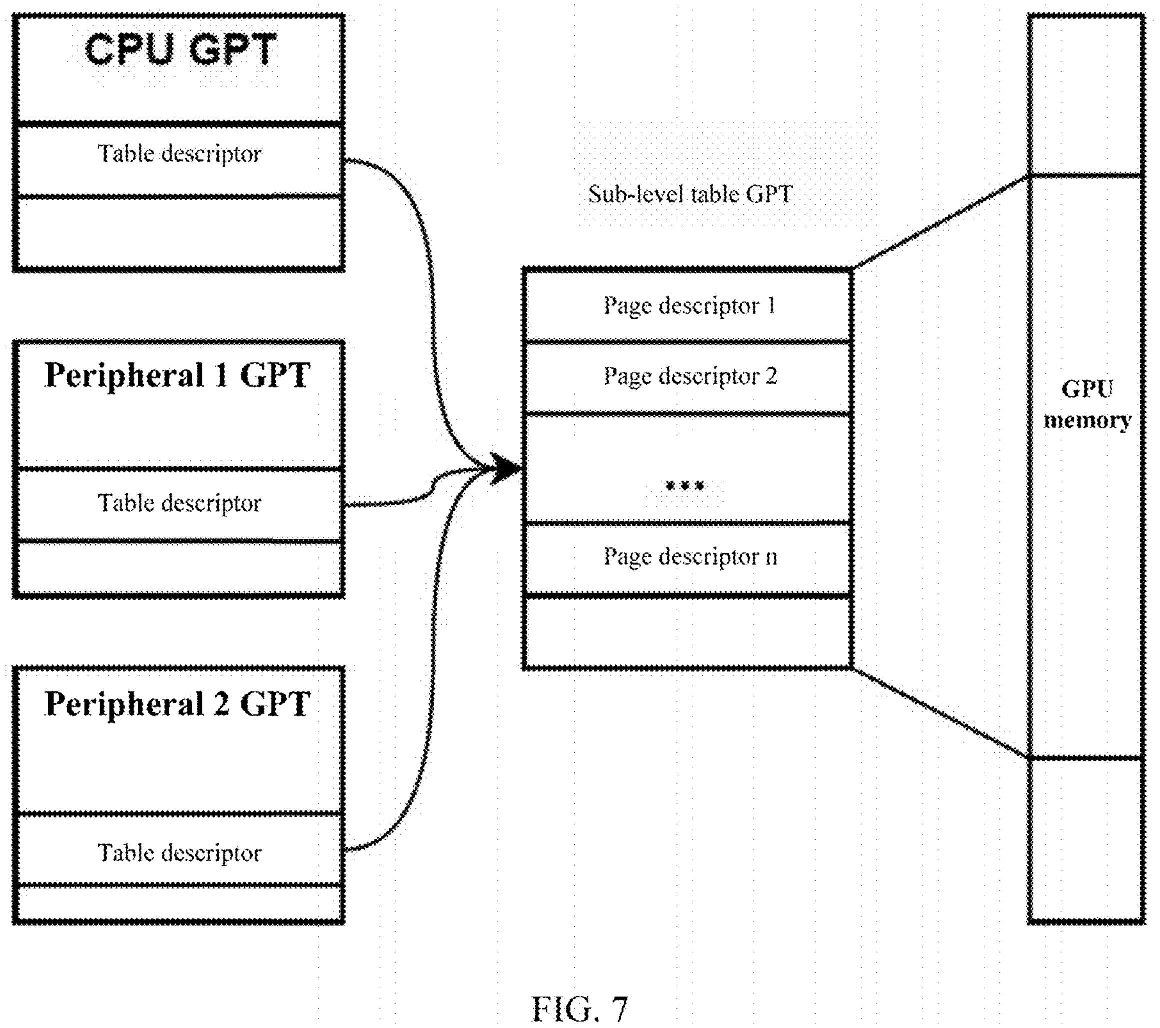
FIG. 7 is a schematic diagram illustrating a sub-level table, according to an embodiment.

FIG. 7 is a schematic diagram illustrating a sub-level table, according to an embodiment. As shown in FIG. 7, the predetermined memory segment is designated as a GPU memory, and the sub-level table is created for this segment of memory. A page descriptor indicates a security attribute of a corresponding page (to which world the page belongs). The GPT tables of the CPU and each peripheral both point to the sub-level table by using table descriptors. Whenever the GPU software creates a stub application, a stub data structure is created in the GPU memory segment, and a security attribute of a corresponding part in the sub-level table is modified when metadata and task code need to be protected. Because the sub-level table is shared by a plurality of GPT tables, the above-mentioned modification is synchronized to each GPT table, thereby simplifying maintenance of the plurality of GPT tables and synchronization of the same content.

For a plurality of GPT tables for a plurality of realms, for example, the GPU GPT table for the realm 1 and the GPU GPT table for the realm 2 in FIG. 6 have similar patterns: Only two world attributes are included: the non-secure world (accessible) and the root world (inaccessible). Therefore, GPT tables of different realms can be generated based on the same template. Based on the template, the entire memory is first set to the root world, and then a corresponding realm segment is set to the non-secure world (normal). During GPU confidential computing, a target segment (a segment storing the metadata and the task code) corresponding to a current GPU task is additionally set to the non-secure world, to allow the GPU to access the target segment.

In this manner, maintenance and update of a GPT table can be optimized, and performance of executing a GPU task can be further improved.

In addition, corresponding to the foregoing method procedure, an embodiment of this specification further discloses a root monitor in a confidential compute architecture. The confidential compute architecture includes a secure world, a realm world, a non-secure world, and a root world. The root monitor is located in the root world. The root monitor may include a shadow task component and a GPU environment protection component.

The shadow task component is configured to: in response to a case in which GPU software in the non-secure world configures a stub data structure of a first stub task in a non-secure world segment of a memory, in a segment, in the memory, corresponding to a first realm, configure a real data structure corresponding to the stub data structure, and store to-be-processed confidential data in the segment. The stub data structure includes a plurality of cache areas allocated based on a cache description provided by a user and metadata indicating each cache area.

The GPU environment protection component is configured to update a granule protection table GPT so that based on an updated GPT table, a target segment is accessible to a GPU and has realm world permission for all other objects. The target segment stores the metadata and task code, provided by the user, of a first GPU task.

The shadow task component is further configured to modify a target mapping relationship so that the GPU executes the first GPU task by using the target segment and the real data structure.

For specific execution process examples of the shadow task component and the GPU environment protection component, references can be made to the foregoing descriptions with reference to FIG. 4 and FIG. 5. Details are not described again.

In a typical embodiment, the root monitor is implemented as secure firmware.

According to still another aspect, an embodiment further provides a computing device, including a memory and some processors. The computing device forms a confidential compute architecture. The confidential compute architecture includes a secure world, a realm world, a non-secure world, and a root world. The root world includes the above-mentioned root monitor.

A person skilled in the art should be aware that, in the above-mentioned one or more examples, functions described in this application can be implemented by hardware, software, firmware, or any combination thereof. When this application is implemented by the software, the functions can be stored in a computer-readable medium or transmitted as one or more instructions or code in a computer-readable medium.

In the above-mentioned specific implementations, the objectives, technical solutions, and beneficial effects of this application are further described in detail. It should be understood that the above-mentioned descriptions are merely specific implementations of this application, but are not intended to limit the protection scope of this application. Any modification, equivalent replacement, improvement, etc. made based on the technical solutions of this application shall fall within the protection scope of this application.

What is claimed is:

1. A computer-implemented method for graphics processing unit (GPU) task execution, comprising:

in a confidential compute architecture, wherein the confidential compute architecture comprises a secure world, a realm world, a non-secure world, and a root world:

receiving, by a first realm over a secure channel, to-be-processed confidential data provided by a user;

receiving, by a host of the non-secure world, a task code and a cache description of a first GPU task that are provided by the user;

configuring, by GPU software in the non-secure world based on the task code and the cache description of a first GPU task that are provided by a user, a stub data structure of a first stub task in a non-secure world segment of a memory, wherein the stub data structure comprises a plurality of cache areas allocated based on the cache description and metadata indicating each cache area;

in a segment, in the memory, corresponding to the first realm, configuring, by a root monitor in the root world, a real data structure corresponding to the stub data structure, and storing the to-be-processed confidential data in the segment;

updating, by the root monitor, a granule protection table granule protection table (GPT) so that based on an updated GPT table, a target segment is accessible to a GPU and has realm world permission for all other objects, wherein the target segment stores the metadata and the task code; and modifying, by the root monitor, a target mapping relationship so that the GPU executes the first GPU task by using the target segment and the real data structure.

2. The computer-implemented method of claim 1, wherein the GPU software comprises a GPU driver and a correlation function library.

3. The computer-implemented method of claim 1, further comprising:

negotiating, by the first realm, a key with the user based on a key negotiation protocol; and constructing the secure channel based on the key.

4. The computer-implemented method of claim 1, wherein the configuring a stub data structure of a first stub task comprises:

allocating a code cache area, and storing the task code in the code cache area;

allocating some stub data cache areas based on the cache description, and storing the cache description in a corresponding stub data cache area; and generating the metadata, wherein the metadata comprises pointers that point to the code cache area and the some stub data cache areas.

5. The computer-implemented method of claim 4, wherein configuring a real data structure corresponding to the stub data structure comprises:

allocating some real data cache areas corresponding to the some stub data cache areas; and storing the to-be-processed confidential data in the some real data cache areas.

6. The computer-implemented method of claim 5, wherein the some real data cache areas comprise an input data cache area and a result data cache area, the input data cache area stores the to-be-processed confidential data, and the result data cache area is configured to store an execution result of the first GPU task.

7. The computer-implemented method of claim 5, wherein:

the configuring a stub data structure of a first stub task comprises:

generating a stub GPU page table based on the some stub data cache areas; and configuring a real cache segment corresponding to the stub data structure comprises:

generating a real GPU page table based on the stub GPU page table and the some real data cache areas.

8. The computer-implemented method of claim 5, wherein the modifying, by the root monitor, a target mapping relationship comprises:

modifying the pointers in the metadata so that the pointers point to the some real data cache areas and the code cache area.

9. The computer-implemented method of claim 7, wherein the modifying, by the root monitor, a target mapping relationship comprises:

modifying GPU memory mapping so that the GPU memory mapping points to the real GPU page table.

10. The computer-implemented method of claim 4, wherein:

the task code and the cache description of the first GPU task that are provided by the user are accompanied by signature information.

11. The computer-implemented method of claim 10, wherein:

before the modifying a target mapping relationship:

verifying, by the root monitor based on the signature information, the task code stored in the code cache area.

12. The computer-implemented method of claim 1, wherein the updating a granule protection table GPT comprises:

updating a first version of GPT table so that the target segment belongs to the realm world in the updated first version of GPT table, wherein the first version of GPT table is used by a CPU and some peripherals.

13. The computer-implemented method of claim 12, comprises:

updating a second version of GPT table so that in the updated second version of GPT table, a segment of the first realm and the target segment are set to an accessible non-secure world memory and no other segment is accessible, wherein the second version of GPT table is used by the GPU to execute a task of the first realm.

14. The computer-implemented method of claim 13, wherein it is set that a GPU memory mapping segment belongs to the root world in the updated first version of GPT table.

15. The computer-implemented method of claim 13, wherein the first version of GPT table comprises a first GPT table used for the CPU and some second GPT tables used for the some peripherals, wherein the first GPT table and the some second GPT tables point to a same sub-level table by using table descriptors.

16. The computer-implemented method of claim 15, wherein the same sub-level table is constructed for a preset memory segment, and wherein the target segment belongs to the preset memory segment.

17. The computer-implemented method of claim 1, further comprising:

after the first GPU task is executed, restoring the target segment so that the target segment belongs to the non-secure world.

18. A non-transitory, computer-readable medium storing one or more instructions executable by a computer system to perform one or more operations for graphics processing unit (GPU) task execution, comprising:

in a confidential compute architecture, wherein the confidential compute architecture comprises a secure world, a realm world, a non-secure world, and a root world:

receiving, by a first realm over a secure channel, to-be-processed confidential data provided by a user;

receiving, by a host of the non-secure world, a task code and a cache description of a first GPU task that are provided by the user;

configuring, by GPU software in the non-secure world based on the task code and the cache description of a first GPU task that are provided by a user, a stub data structure of a first stub task in a non-secure world segment of a memory, wherein the stub data structure comprises a plurality of cache areas allocated based on the cache description and metadata indicating each cache area;

in a segment, in the memory, corresponding to the first realm, configuring, by a root monitor in the root world, a real data structure corresponding to the stub data structure, and storing the to-be-processed confidential data in the segment;

updating, by the root monitor, a granule protection table granule protection table (GPT) so that based on an updated GPT table, a target segment is accessible to a GPU and has realm world permission for all other objects, wherein the target segment stores the metadata and the task code; and modifying, by the root monitor, a target mapping relationship so that the GPU executes the first GPU task by using the target segment and the real data structure.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for graphics processing unit (GPU) task execution, comprising:

in a confidential compute architecture, wherein the confidential compute architecture comprises a secure world, a realm world, a non-secure world, and a root world:

receiving, by a first realm over a secure channel, to-be-processed confidential data provided by a user;

receiving, by a host of the non-secure world, a task code and a cache description of a first GPU task that are provided by the user;

configuring, by GPU software in the non-secure world based on the task code and the cache description of a first GPU task that are provided by a user, a stub data structure of a first stub task in a non-secure world segment of a memory, wherein the stub data structure comprises a plurality of cache areas allocated based on the cache description and metadata indicating each cache area;

in a segment, in the memory, corresponding to the first realm, configuring, by a root monitor in the root world, a real data structure corresponding to the stub data structure, and storing the to-be-processed confidential data in the segment;

updating, by the root monitor, a granule protection table granule protection table (GPT) so that based on an updated GPT table, a target segment is accessible to a GPU and has realm world permission for all other objects, wherein the target segment stores the metadata and the task code; and modifying, by the root monitor, a target mapping relationship so that the GPU executes the first GPU task by using the target segment and the real data structure.

* * * * *